United States Patent [19]

Winsor et al.

[11] E Re. 29,816

[45] Reissued Oct. 31, 1978

[54] LOCKABLE HINGE STRUCTURE

[75] Inventors: Robert B. Winsor, Senneville; George Thomson, Pierrefonds, both of Canada

[73] Assignee: IEC-Holden Ltd., Montreal, Canada

[21] Appl. No.: 853,508

[22] Filed: Nov. 21, 1977

Related U.S. Patent Documents

Reissue of:

[64] Patent No.: 3,987,516
Issued: Oct. 26, 1976
Appl. No.: 628,897
Filed: Nov. 5, 1975

[51] Int. Cl.[2] ..... E05D 11/10

[52] U.S. Cl. ..... 16/143; 105/377; 114/203; 292/256.5

[58] Field of Search ..... 16/139–147, 16/128 R; 292/256.5; 105/377; 114/203

[56] References Cited

U.S. PATENT DOCUMENTS

| | | | |
|---|---|---|---|
| 2,752,628 | 7/1956 | Platsou | 16/143 |
| 2,817,870 | 12/1957 | Howell | 16/147 |
| 2,837,040 | 6/1958 | Johansson | 105/377 |
| 3,025,094 | 3/1962 | Buchanan | 16/147 X |
| 3,064,851 | 11/1962 | Guigli | 16/147 X |
| 3,438,083 | 4/1969 | Kirk | 16/139 |

FOREIGN PATENT DOCUMENTS

| | | | |
|---|---|---|---|
| 1,102,596 | 3/1961 | Fed. Rep. of Germany | 292/256.5 |
| 913,628 | 12/1962 | United Kingdom | 114/203 |
| 228,541 | 1/1969 | U.S.S.R. | 114/203 |

*Primary Examiner*—James Kee Chi

[57] ABSTRACT

A lock hinge preferably, but not exclusively, for use with a hatch cover structure for a transportation vehicle. The lock hinge comprises a latch bracket and a base bracket. The base bracket is provided with a pivot bar. The latch bracket has a saddle member defining a hinge seat with a mouth opening for receiving at least a portion of the pivot bar therein. The latch bracket further is provided with a latch member having a lever end and a gate end. The latch member is interconnected to the saddle member by a flexible plate whereby the gate end is displaceably positioned adjacent the mouth opening of the hinge seat to retain the pivot bar captive in the hinge seat to interconnect both the latch and base brackets. When secured to a hatch cover, which normally closes the hatch opening in a wall of the vehicle, at least one lock hinge is secured on a respective one of a pair of opposed sides of the cover.

14 Claims, 4 Drawing Figures

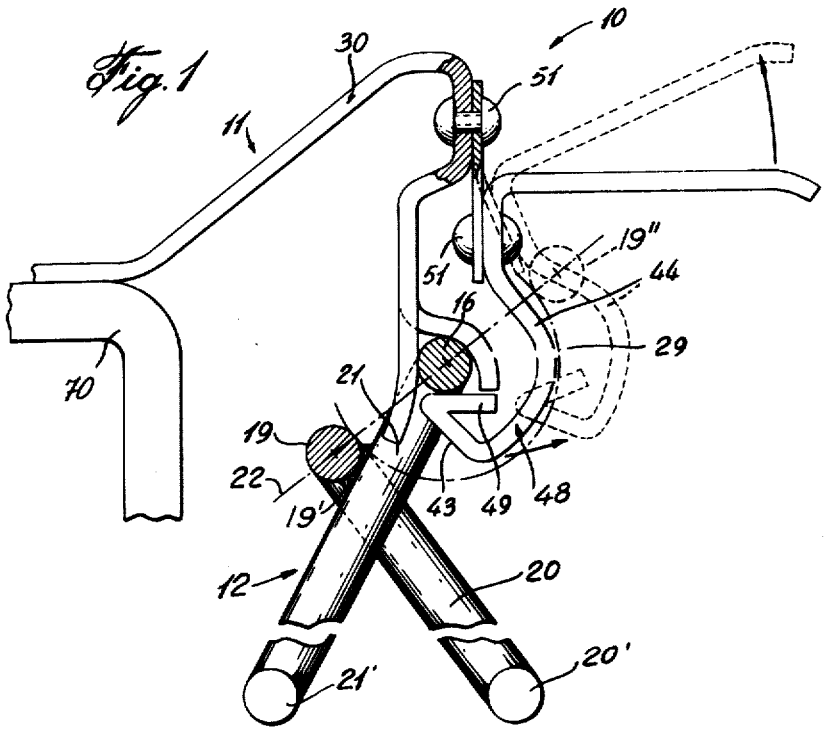
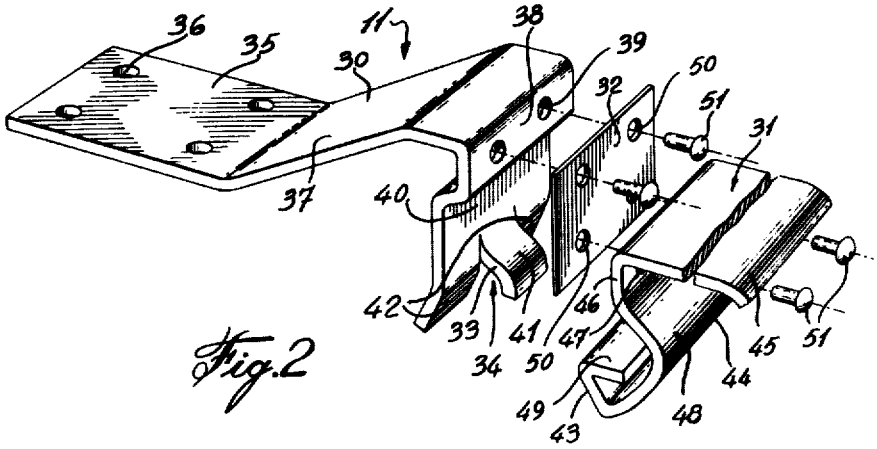
Fig. 2

LOCKABLE HINGE STRUCTURE

Matter enclosed in heavy brackets [ ] appears in the original patent but forms no part of this reissue specification; matter printed in italics indicates the additions made by reissue.

BACKGROUND OF INVENTION (a) Field of the Invention

The present invention relates to a lock hinge structure and more particularly, but not exclusively, to a lock hinge for use with a hatch cover normally on transportation vehicles such as railway cars, tractor trailers, ships, etc.

(b) Description of Prior Art

It is important to provide a lock hinge for use on hatch covers of transportation vehicles such as railway cars in order for the hatch cover to be swung open from either side of the cover. It is also important to provide a lock hinge which will hold the hatch cover closed during transit of the vehicle and therefore the lock hinge must be easily lockable. It is also important to provide a lock hinge which is easily unlocked and which requires a minimum amount of force for opening.

SUMMARY OF INVENTION

It is therefore a feature of the present invention to provide a lock hinge which can be easily and positively locked and which requires a minimum amount of force, in a predetermined direction, in order to unlock the same.

It is a further feature of the present invention to provide a lock hinge arrangement which is easy and economical to construct and install.

It is a still further feature of the present invention to provide a lock hinge for securement to the hatch cover of a transportation vehicle and which is securable on opposed sides of the cover whereby the cover may be opened from opposed sides thereof.

According to the above features, from a broad aspect, the present invention provides a lock hinge comprising a latch bracket and a base bracket. The base bracket is provided with a pivot bar. The latch bracket is provided with a saddle member defining a hinge seat with a mouth opening for receiving at least a portion of the pivot bar therein. The latch bracket is also provided with a latch member having a lever end and a gate end. The latch member is interconnected to the saddle member by a flexible plate whereby the gate end is displaceably positioned adjacent the mouth opening of the hinge seat to retain the pivot bar captive in the hinge seat to interconnect both the latch and base brackets.

BRIEF DESCRIPTION OF DRAWINGS

A preferred embodiment of the present invention will now be described with reference to the accompanying drawings in which:

FIG. 1 is a side view, partly fragmented, of the lock hinge of the present invention;

FIG. 2 is an exploded perspective view showing the various parts of the latch bracket;

DESCRIPTION OF PREFERRED EMBODIMENTS

The lock hinge of the present invention will now be described with reference to FIGS. 1 to 3 of the accompanying drawings. The lock hinge is generally shown at 10 and comprises a latch bracket 11 and a base bracket 12.

Figure 3:
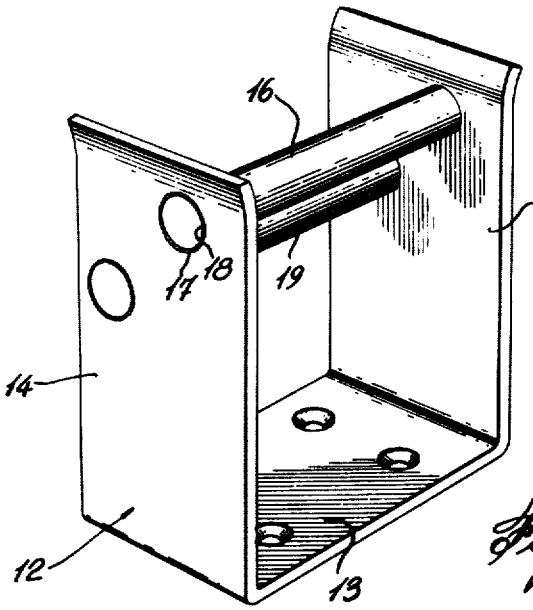
FIG. 3 is a perspective view showing one version of the base bracket.

Referring now more specifically to FIG. 3, there is shown one form of constructing the base bracket 12 and it consists generally of a U-shaped bracket having a bottom securable wall 13 and opposed parallel side walls 14 and 15. A pivot bar 16 is secured transversely across the side walls 14 and 15 by suitable means such as spot-welds 17 formed between the end of the pivot bar 16 and the peripheral side edge 18 of the side walls. A stop member, herein a bar 19, is secured transversely across the side walls 14 and 15 and spaced below the pivot bar 16 and to one side thereof. The stop bar 19 is secured to the U-shaped bracket in a similar manner as is the pivot bar.

Referring now to FIG. 1, there is shown a further embodiment of the base bracket 12 and it is herein constituted by two inverted U-shaped bars 20 and 21 each having an interconnecting bar portion constituting the pivot bar 16 and the stop bar 19. The free ends 20′ and 21′ of bars 20 and 21, respectively, are bent outwards parallel to the horizontal axes and to bars 16 and 19 whereby to provide means to secure the bracket to a surface (not shown). The bars 20 and 21 are secured together by a weld 19′. As can be seen from FIG. 1, the pivot bar and stop bar have their longitudinal central axes located transverse to an axis 22 permitting the latch bracket 11 to be pivoted about the pivot bar 16 through a 180° arc above a predetermined plane. The stop bar 19 is indicated in phantom lines at 19″ designating its position relative to the latch bracket 11 after it has been pivoted through 180° from its position shown in FIG. 1. More details of the coation of the latch bracket with the base bracket will be described hereinbelow.

Referring again to FIGS. 1 and 2, there is shown the construction of the latch bracket 11. It consists essentially of three parts, a saddle member 30, a latch member 31, and a flexible plate 32 and fasteners therefor. The saddle member 30 defines a hinge seat 33 having a mouth opening 34 for receiving at least a portion of the pivot bar 16 therein. The saddle member 30 is constituted by a flat rectangular member of rigid material, such as steel, and is formed to define a flat securable end section 35 having holes 36 therein to secure the saddle member to a hatch cover, door, or other type closure members. An extension portion 37 extends angularly from the securable end section 35 and outwardly thereof, as shown more clearly in FIG. 1. The member 30 is then bent in a direction opposite to that of the extension portion 37 to define a leaf spring securement section 38 provided with holes 39 therein for securement to the flexible plate 32. The leaf spring securement section 38 extends substantially transverse to the plane of the flat securable end section 35.

The hinge seat 33 is formed in a hinge seat section 40 which is disposed in the same plane as the securement face section and below such section. The hinge seat is constituted by a tongue 41 bent and extending angularly outwardly of a central section of the hinge seat section 40 and extending toward the end of the section 40. A side arm 42 is thus formed on each side of the tongue 41 whereby the pivot bar is retained transversely between the inside surface of the tongue 41 and the outside surface of the side arms 42, as more clearly shown in FIG. 1.

The latch member 31 is formed from a flat rectangular member of similar material as the saddle member and defines a lever end 45 in an end section thereof. The latch member 31 also defines a leaf spring securement section 46 integral with the lever end section and extending substantially transverse to the plane of the lever section. Holes 47 are provided in section 46 whereby to secure to the flexible plate 32. A gate section 48 is formed at the other end of the latch member 31 and is provided with a flat end portion 49 extending substantially parallel to the lever section 45 and slightly forwardly of the planar axis of the leaf spring securement section 46. An inclined face section 43 is provided below the flat portion 49 for displacement of the latch member 31 by the pivot bar 16. Flat portion 49 is not necessary to the function of the latch member 31, depending on geometry of application. In the absence of flat portion 49, the end of the inclined face section 43 provides the same function of capturing the pivot bar 16 in the hinge seat 33.

The flexible plate 32 is a metallic leaf spring and is provided with holes 50 adjacent opposed ends thereof. The leaf spring 32 is secured adjacent one end to the saddle member 30 and adjacent its other end to the latch member 31 by means of bolts 51 or other suitable securement means. The leaf spring extends substantially transverse to the securable end section 35 of the saddle member 30 whereby the flat end portion of the gate section 48 lies below the mouth opening 34 of the hinge seat 33, as more clearly shown in FIG. 1. The leaf spring 32 being flat constitutes a neutral spring geometry whereby any deflection from the flat plane results in a loading of the spring.

Figure 4:
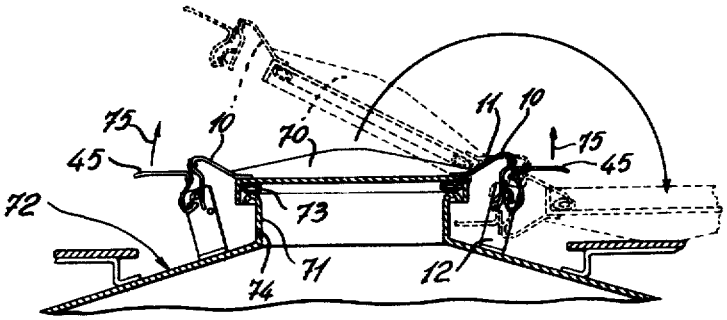
FIG. 4 is a fragmented sectional view of a hatch for a railway car vehicle having lock hinges of the present invention secured to the hatch cover.

Referring now to FIG. 4, there is shown the lock hinge 10 of the present invention secured to a hatch cover 70 positioned over a hatch opening 71 on the roof 72 of a railway vehicle. The base bracket 12 is herein-shown as secured to the roof 72 of the vehicle whilst the latch bracket 11 is secured to the hatch cover 70. A flexible gasket 73 is secured in the underface of the cover 70 and abuts against a flange wall 74 about the opening 71. The flexible gasket 73 exerts upward pressure on the hatch cover 70, thus causing the pivot bar 16 to apply a slight downward pressure against the flat gate end portion 49 whereby the flexible plate 32 is loaded in simple tension when the pivot bar 16 tries to separate from the saddle member 30. It can be seen, that with this arrangement, the hatch cover can be opened from either side of the vehicle by merely lifting the lever end 45 upwardly in the direction of the arrow 75.

The operation of the lock hinge of the present invention is summarized briefly as follows. The hatch cover 70 will close automatically under a small downward closing force, without deliberate operation of the latch bracket 11, through cooperation of the gate end section 48 and the pivot bar 16, where the gate end section 48 is pushed aside to the open position by the pivot bar 16 as the pivot bar is entering the saddle member hinge seat 33. This side movement of the latch bracket is facilitated by the inclined face 43 below the flat end portion 49 and the flexibility of the leaf spring 32. The gate end section 48 will return to a closed position, with the flat end portion 49 positioned under the pivot bar 16, by the force exerted by the spring load provided by the leaf spring 32.

The latch will open when a lifting force is deliberately applied to the lever end 45 of the latch member 31, thereby releasing from the pivot bar, such that the hatch cover 70 can be opened. The lifting force on the lever end 45 of the latch member 31 is also the lifting force that causes the hatch to separate from the hatch opening in conjunction with the upward pressure of the gasket 73. The hatch cover 70 will hinge about the hinge and latch arrangement provided by the lock hinge on the opposite side of the hatch cover 70.

Once separated, the latch closes and will support the weight of the hatch cover 70 on the base bracket pivot bar, without causing the latch to reopen, unless added downward force is deliberately applied to the latch bracket 11 or hatch cover 70. This feature allows a lid or cover, etc., with more than one lock hinge, to be opened by one man, provided the lid is somewhat flexible, i.e. in the case of a lid with two lock hinges per side, one can be opened and the lock hinge will support the flexed lid in the open position, so that the operator can move to the second lock hinge and open it, thereby releasing the hatch or lid to swing open, without the first lock hinge reopening and relatching the cooperating base bracket pivot bar.

Also, the curved section 44 of the gate end comes into close proximity with the stop member 19 throughout the last 90° of the 180° relative rotation, such that the gate end 48 cannot move out of cooperation with the mouth opening 34 and hence the pivot bar 16 cannot release from the hinge seat 33. The arc line 29 shows the displacement of the bar 19 relative to the curved section 44 during the travel of the latch bracket 11 about the pivot bar 16. This feature prevents deliberate or accidental release of the pivot bar 16 from the cooperating hinge seat 33 when the hatch cover is not secured at the opposite side during opening of the hatch cover.

As illustrated in FIG. 1, the lid can be hinged through 180° about the pivot bar 16 without the latch bracket 11 releasing the pivot bar 16. That is, a lid can swing from the closed position through 180°.

The leaf spring mounting arrangement is such that the leaf spring is loaded only in simple tension when the pivot bar 16 tries to separate from the saddle member, as previously described. The leaf spring 32 operates as a cantiliver spring that when deflected urges the latch member 31 to its closed neutral position. Only when the latch bracket is open by the deliberate operator force on the lever end 45 or by the hinge pivot bar entering the closed latch position by displacing the gate end section of the latch member 31.

The entire arrangement of the lock hinge 10 as shown relative to the hatch cover 70 in FIG. 4 can be reversed whereby the base bracket 12 is mounted on the hatch cover 70 and the latch bracket 11 is mounted adjacent the hatch opening on the roof of the vehicle. This reverse arrangement changes only the operating method in that the deliberate force applied to open the latch is downward, while the force applied to open the hatch cover is upwards. This arrangement might be required by hatch geometry. This arrangement is less simple in that the operator must provide first and then maintain a downward force on the latch member lever end, while providing an upward force on the hatch cover. This arrangement is nevertheless simple and viable.

Other obvious modifications of the present invention are intended to be covered provided they fall within the scope of the present invention as defined by the appended claims.

We claim:

1. A lock hinge comprising a latch bracket and a base bracket; said base bracket having a pivot bar; said latch bracket having a saddle member defining a hinge seat with a mouth opening for receiving at least a portion of said pivot bar therein; a latch member having a lever end and a gate end; said latch member being interconnected to said saddle member by a flexible plate which is secured adjacent one end to said saddle member and adjacent an opposed end to said latch member, said gate end being displaceably held adjacent said mouth opening of said hinge seat by said flexible plate to retain said pivot bar captive in said hinge seat to interconnect said latch bracket to said base bracket, said gate end being displaceable away from adjacent said hinge seat mouth opening by [pulling] *displacing* said lever end in a predetermined direction against the spring load exerted by said [leaf] *flexible plate.*

2. A lock hinge as claimed in claim 1, wherein said saddle member is a flat rectangular member of rigid material formed to define a securable end section, an extension portion extending angularly from said securable end section, a leaf spring securement section integral with said extension portion and disposed substantially transverse to the plane of said flat securable end section, and a hinge seat section formed below said leaf spring securement section and disposed in the same plane as said securement face section.

3. A lock hinge as claimed in claim 2, wherein said hinge seat is constituted by a tongue extending angularly outwardly of a central section of said hinge seat section and extending toward and end thereof, a side arm formed by said hinge seat section on each side of said tongue, said pivot bar being retained transversely between said tongue and said side arms.

4. A lock hinge as claimed in claim 2, wherein said latch member is a flat rectangular member of rigid material formed to define said lever end at an end section thereof, a leaf spring securement section intergral with and disposed substantially transverse to the plane of said lever section, a gate section formed at the other end of said latch member and having an inclined face section positioned in a lower portion thereof, said inclined face section protruding from a lower end of a curved section and extending away from said curved section.

5. A lock hinge as claimed in claim 2, wherein said latch member is a flat rectangular member of rigid material formed to define said lever end at an end section thereof, a leaf spring securement section integral with and disposed substantially transverse to the plane of said lever section, a gate section formed at the other end of said latch member and having a flat end portion extending substantially parallel to said lever section and slightly forwardly of the planar axis of said leaf spring securement section and an inclined face section below said flat end portion and a curved section upwardly therefrom and above and behind said inclined face section.

6. A lock hinge as claimed in claim 4, wherein said leaf spring extending substantially transverse to said securable end section of said saddle member whereby said inclined face section lies below said mouth opening of said hinge seat.

7. A lock hinge as claimed in claim 1, wherein said base bracket is further provided with a stop member to prevent opening of the latch member during rotation of said latch bracket about said pivot bar.

8. A lock hinge as claimed in claim 7, wherein said stop member is a stop bar secured adjacent and below said pivot bar, the longitudinal axis of both said stop bar and said pivot bar extending substantially parallel to each other.

9. A lock hinge as claimed in claim 7, wherein said base bracket is a generally U-shaped bracket having a bottom securable wall and opposed parallel side walls, said pivot bar being secured transversely across said side walls adjacent an upper end thereof, said stop member being a stop bar secured transversely across said side walls below said pivot bar and to one side thereof.

10. A lock hinge as claimed in claim 8, wherein said stop bar is spaced from said pivot bar whereby upon pivotal displacement of said latch bracket about said pivot bar, said stop bar will be closely spaced from a curved section of said latch bracket to prevent disengagement of said latch bracket with said pivot bar.

11. A hatch cover structure for a transportation vehicle comprising a hatch cover, a hatch opening in a wall of said vehicle, said hatch cover having at least one lock hinge secured on a respective one of a pair of opposed sides of said cover, said lock hinge comprising a latch bracket and a base bracket, one of said brackets being secured to said hatch cover and the other to said wall of said vehicle adjacent a respective one of said cover opposed sides, said base bracket having a pivot bar, said latch bracket having a saddle member defining a hinge seat with a mouth opening for receiving at least a portion of said pivot bar therein, a latch member having a lever end and a gate end, said latch member being interconnected to said saddle member by a flexible plate which is secured adjacent one end to said saddle member and adjacent an opposed end to said latch member, said gate end being displaceably held adjacent said mouth opening of said hinge seat by said flexible plate to retain said pivot bar captive in said hinge seat to interconnect said latch bracket to said base bracket, said gate end being displaceable away from adjacent said hinge seat mouth opening by [pulling] *displacing* said lever end in a predetermined direction against the spring load exerted by said [leaf spring] *flexible plate.*

12. A hatch cover structure as claimed in claim 11, wherein said leaf spring is of a selected resilient force relative to the weight of said hatch cover whereby the lifting force applied to said lever end is substantially the same as the lifting force necessary to cause the cover to separate from the hatch opening.

13. A hatch cover structure as claimed 11, wherein said saddle member is a flat rectangular member of rigid material formed to define a securable end section, an extension portion extending angularly from said securable end section, a leaf spring securement section integral with said extension portion and disposed substantially transverse to the plane of said flat securable end section, and a hinge seat section formed below said leaf spring securement section and disposed in the same plane as said securement face section, said hinge seat is constituted by a tongue extending angularly outwardly of a central section of said hinge seat section and extending toward an end thereof, a side arm formed by said hinge seat section on each side of said tongue, said pivot bar being retained transversely between said tongue and said side arms, said securable end section of said saddle member being secured to a top wall of said hatch cover adjacent one of said opposed sides, said base bracket being secured to said wall of said vehicle adjacent a respective one of said opposed sides of said cover.

14. A hatch cover structure as claimed in claim 11, wherein a stop bar is further provided in said base bracket and secured adjacent and below said pivot bar, the longitudinal axis of both said stop bar and pivot bar extending substantially parallel to each other, said stop bar is spaced from said pivot bar whereby upon pivotal displacement of said latch bracket about said pivot bar, said stop bar will be closely spaced from a curved section of said latch bracket to prevent disengagement of said latch bracket with said pivot bar.

* * * * *